(12) United States Patent
May et al.

(10) Patent No.: US 11,518,290 B2
(45) Date of Patent: Dec. 6, 2022

(54) VEHICLE INTERLOCKING TAILGATE UTILITY BAR

(71) Applicants:Carl D May, Rochester Hills, MI (US); Bryan J Macek, Auburn Hills, MI (US); Douglas E Peoples, Bruce Township, MI (US)

(72) Inventors: Carl D May, Rochester Hills, MI (US); Bryan J Macek, Auburn Hills, MI (US); Douglas E Peoples, Bruce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 110 days.

(21) Appl. No.: 16/999,324

(22) Filed: Aug. 21, 2020

(65) Prior Publication Data

US 2021/0053478 A1 Feb. 25, 2021

Related U.S. Application Data

(60) Provisional application No. 62/890,116, filed on Aug. 22, 2019.

(51) Int. Cl.
*B60P 1/43* (2006.01)
*B62D 63/04* (2006.01)
*B60P 7/08* (2006.01)
*B62D 33/027* (2006.01)

(52) U.S. Cl.
CPC ............. *B60P 1/435* (2013.01); *B60P 7/0815* (2013.01); *B62D 63/04* (2013.01); *B62D 33/0273* (2013.01)

(58) Field of Classification Search
CPC ...................................................... B60P 1/435

USPC .... 296/37.1, 50, 51, 61, 26, 183.1; 414/537, 414/523
See application file for complete search history.

(56) References Cited

U.S. PATENT DOCUMENTS

| 3,737,058 | A | * | 6/1973 | Johnson | B60P 1/433 296/61 |
| 4,884,838 | A | * | 12/1989 | Slater | B62D 35/007 296/180.1 |
| 6,575,516 | B2 | | 6/2003 | Webber | |
| 6,692,055 | B2 | | 2/2004 | Schilling | |
| 8,007,021 | B2 | * | 8/2011 | Pleet | B60P 3/14 296/50 |
| 9,067,525 | B1 | | 6/2015 | Ninov et al. | |
| 9,346,390 | B1 | | 5/2016 | Croswhite | |
| 2009/0160206 | A1 | | 6/2009 | Pleet et al. | |

(Continued)

*Primary Examiner* — D Glenn Dayoan
*Assistant Examiner* — Sunsurraye Westbrook
(74) *Attorney, Agent, or Firm* — Ralph E. Smith

(57) ABSTRACT

An interlocking tailgate utility bar for a vehicle having a tailgate at least partially defining a cargo area includes a top surface, a bottom surface opposite the top surface and configured to be disposed against an inner wall of the tailgate when the tailgate is in an open position, opposed front and rear side surfaces, and opposed ends. A striker assembly is disposed at each end of the opposed ends and includes a striker configured to be releasably coupled to tailgate latches located on opposed sides of the tailgate to thereby selectively releasably secure the interlocking tailgate utility bar to the tailgate. A rail channel is configured to receive an attachment device of a vehicle accessory to thereby removably couple the vehicle accessory to the interlocking tailgate utility bar and thus the vehicle.

19 Claims, 6 Drawing Sheets

(56) References Cited

U.S. PATENT DOCUMENTS

2011/0271878 A1 11/2011 Parks et al.
2013/0094930 A1* 4/2013 Kalergis .................. B60P 1/435
296/183.1

* cited by examiner

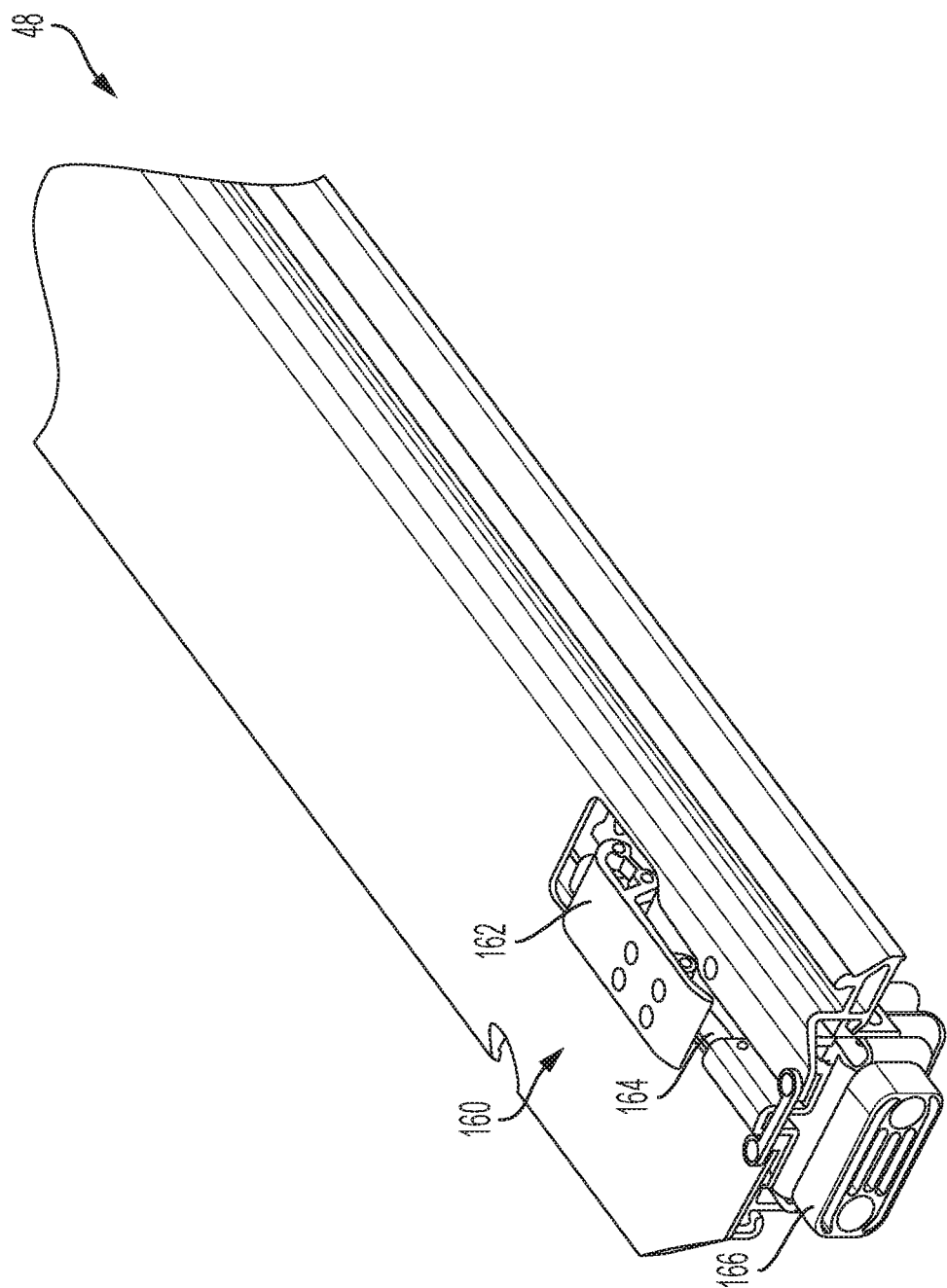

VEHICLE INTERLOCKING TAILGATE UTILITY BAR

CROSS REFERENCE TO RELATED APPLICATION

This application claims the benefit of U.S. Provisional App. No. 62/890,116, filed Aug. 22, 2019, the contents of which are incorporated herein in their entirety by reference thereto.

FIELD

The present application relates generally to vehicles and, more particularly, to an interlocking utility bar for a vehicle tailgate.

BACKGROUND

Vehicles having storage beds, e.g., pickup trucks, are capable of storing and transporting large objects. Examples of these large objects include recreational vehicles such as all-terrain vehicles (ATVs) and motorcycles. These large objects are typically very heavy and are difficult to be lifted into the storage bed by a single person, such as a driver of the vehicle. Loading ramps provide for easier loading of these large objects into the storage bed. However, some loading ramps require rails or channels permanently mounted to the tailgate, which can increase cost and complexity of the tailgate. Thus, while such conventional loading ramps do work for their intended purpose, there remains a need for improvement in the relevant art.

SUMMARY

In accordance with one example aspect of the invention, an interlocking tailgate utility bar for a vehicle having a tailgate at least partially defining a cargo area is provided. In one example embodiment, the interlocking tailgate utility bar includes a top surface, a bottom surface opposite the top surface and configured to be disposed against an inner wall of the tailgate when the tailgate is in an open position, opposed front and rear side surfaces, and opposed ends. A striker assembly is disposed at each end of the opposed ends and includes a striker configured to be releasably coupled to tailgate latches located on opposed sides of the tailgate to thereby selectively releasably secure the interlocking tailgate utility bar to the tailgate. A rail channel is configured to receive an attachment device of a vehicle accessory to thereby removably couple the vehicle accessory to the interlocking tailgate utility bar and thus the vehicle.

In addition to the foregoing, the described interlocking tailgate utility bar may include one or more of the following features: wherein the rail channel is defined by a generally circular wall that includes an upper lip and a lower lip; wherein a gap is defined between the upper lip and the lower lip that allows the attachment device to be inserted into the rail channel when the accessory is oriented at an angle within an installation zone; wherein at least one of the upper lip and the lower lip are configured to engage the attachment device and prevent removal of the attachment device from the rail channel when the accessory is oriented at an angle within a locking zone; and wherein the rail channel is formed at least partially within an intersection between the top surface and the rear side surface.

In addition to the foregoing, the described interlocking tailgate utility bar may include one or more of the following features: wherein the striker assembly comprises a support plate and a striker; wherein the support plate comprises an attachment flange and an extension plate, wherein the attachment flange is coupled to the bottom surface and the extension plate extends outwardly from the attachment flange; and wherein: the striker is coupled to a distal end of the extension plate, the striker is oriented parallel to the bottom surface, the extension plate is oriented perpendicular to the striker, and the attachment flange is oriented perpendicular to the extension plate.

In addition to the foregoing, the described interlocking tailgate utility bar may include one or more of the following features: wherein the striker assembly is rotatably coupled to the bottom surface and configured to fold into a receiving cavity formed in the bottom surface such that the striker assembly is moved to a concealed position therein; a first section hingedly coupled to a second section, the first section hingedly coupled to the second section by a locking hinge to enable selective movement between a rigid locked position, and an unlocked position allowing relative movement between the first and second section; wherein the locking hinge comprises a first leaf coupled to the first section and including a first knuckle, a second leaf coupled to the second section and including a second knuckle, and a hinge pin received within the first and second knuckles; a locking handle operably coupled to the hinge pin, wherein the locking handle is configured to be actuated to move the locking hinge between the locked position and the unlocked position; and a first section coupled to a second section, wherein the first section includes a sliding plunger system having an engagement member configured to selectively move outwardly away from the first section to contact a sidewall of the cargo area for securing the interlocking tailgate utility bar therein.

In another example aspect of the invention, a vehicle is provided. In one example embodiment, the vehicle includes a tailgate at least partially defining a cargo area and movable between an open position and a closed position, and an interlocking tailgate utility bar movable between a stowed position within the cargo area, and a deployed position removably coupled to the tailgate when in the open position. The interlocking tailgate utility bar includes a top surface, a bottom surface opposite the top surface and configured to be disposed against an inner wall of the tailgate when the tailgate is in the open position, opposed front and rear side surfaces, and opposed ends. A rail channel is configured to receive an attachment device of a vehicle accessory to thereby removably couple the vehicle accessory to the interlocking tailgate utility bar and thus the vehicle.

In addition to the foregoing, the described vehicle may include one or more of the following features: wherein the interlocking tailgate utility bar further includes a striker assembly disposed at each end of the opposed ends and including a striker configured to be releasably coupled to tailgate latches located on opposed sides of the tailgate to thereby selectively releasably secure the interlocking tailgate utility bar to the tailgate; and wherein the interlocking tailgate utility bar further comprises a first section hingedly coupled to a second section, and wherein the striker assembly is rotatably coupled to the bottom surface and configured to fold into a receiving cavity formed in the bottom surface such that the striker assembly is moved to a concealed position therein.

In addition to the foregoing, the described vehicle may include one or more of the following features: the accessory, wherein the accessory is a load ramp, and a utility rail assembly coupled to a sidewall at least partially defining the cargo area, wherein the utility rail is configured to removably receive the load ramp to stow the cargo ramp within a cargo area of the vehicle; wherein the attachment device comprises a flat upper surface, a rounded forward surface, a flat lower surface, and a rear stop; and wherein the rail channel is defined by a generally circular wall that includes an upper lip and a lower lip, wherein a gap is defined between the upper lip and the lower lip that allows the attachment device to be inserted into the rail channel when the accessory is oriented at an angle within an installation zone, and wherein at least one of the upper lip and the lower lip prevent are configured to engage the attachment device and prevent removal of the attachment device from the rail channel when the accessory is oriented at an angle within a locking zone.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 8 is a perspective view of another example interlocking tailgate utility bar that includes an example sliding plunger system according to the principles of the present disclosure.

DESCRIPTION

According to the principles of the present disclosure, an interlocking utility bar for a pickup truck bed and tailgate is provided. In one example, the utility bar is sized for storage in lumber pockets in the pickup truck bed, and can be subsequently removed and attached to the tailgate to provide an interface for attaching ramps thereto. The interlocking tailgate utility bar includes a pair of strikers similar to the strikers that interlock with the latch mechanisms in the tailgate, which are spaced at the correct distance to interlock with the latch mechanisms. The strikers can be configured for foldable storage into the utility bar, and a rail channel is formed in the utility bar to allow one or more ramps or other accessories to be locked therein. As such, the interlocking tailgate utility bar is selectively locked into the tailgate latches in order to provide a secure and firm locking apparatus for ramps and other accessories.

Figure 1:
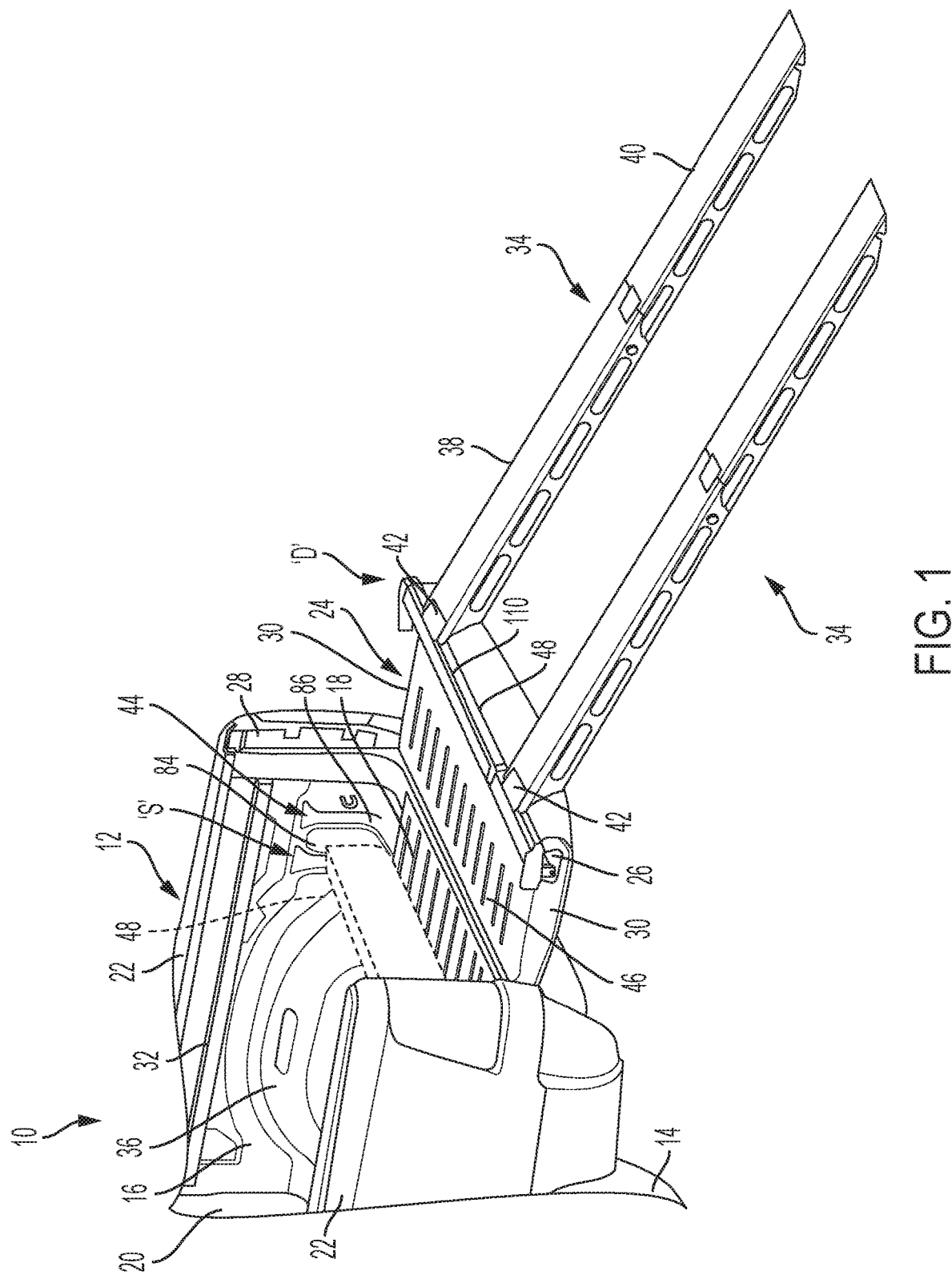
FIG. 1 is a rear perspective view of an example vehicle having a storage bed with a tailgate in an open position, and ramp members on an interlocking tailgate utility bar in a deployed position, according to the principles of the present disclosure.

Referring now to FIG. 1, a rear perspective view of a vehicle 10 is illustrated. The vehicle 10 has a storage bed 12 located above one or more rear wheels 14. In one exemplary implementation, the vehicle 10 is a pickup truck as illustrated. In another exemplary implementation, the vehicle 10 is a vehicle having a cargo area above the rear wheels 14 and a closure member, such as a sport utility vehicle with a rear cargo area and a rear hatch. The storage bed 12 provides a truck bed or cargo area 16 defined at least partially by a floor 18, a forward wall 20, sidewalls 22, and a tailgate 24 (shown in an open position).

The tailgate 24 includes at least one tailgate latch 26 operably associated with a corresponding striker 28 extending inwardly from opposite sidewalls 22. In the example implementation, tailgate 24 includes one tailgate latch 26 positioned on opposite sides 30 of the tailgate 24. When the tailgate 24 is moved to the closed position, the tailgate latches 26 engage with the strikers 28, thereby securing the tailgate 24 to the sidewalls 22 to retain the tailgate 24 in the closed position. When the tailgate latches 26 are actuated to release the strikers 28, the tailgate 24 may then be moved to the open position.

In the example embodiment, the storage bed 12 includes a utility rail assembly 32, such as that described in commonly owned and co-pending U.S. patent application Ser. No. 16/281,701, the contents of which are incorporated herein by reference thereto. As shown, the utility rail assembly 32 is coupled to each sidewall 22 and configured to removably receive a cargo or load ramp 34. However, it will be appreciated that vehicle 10 may include any suitable number of utility rail assemblies and associated load ramps. Each utility rail assembly 32 is configured to removably receive one load ramp 34 for stowing of the load ramp along sidewall 22 above a wheel well 36. Such an arrangement advantageously allows load ramps 34 to be transported with the vehicle 10 while minimizing interference on the cargo space 16 of storage bed 12.

Figure 6:
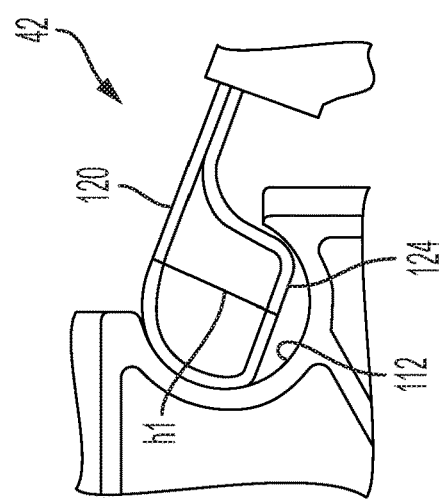
FIG. 6 is a side cross-sectional view of a locked position of the connection between the ramp member and the interlocking tailgate utility bars shown in FIG. 1, according to the principles of the present disclosure.
Figure 7:
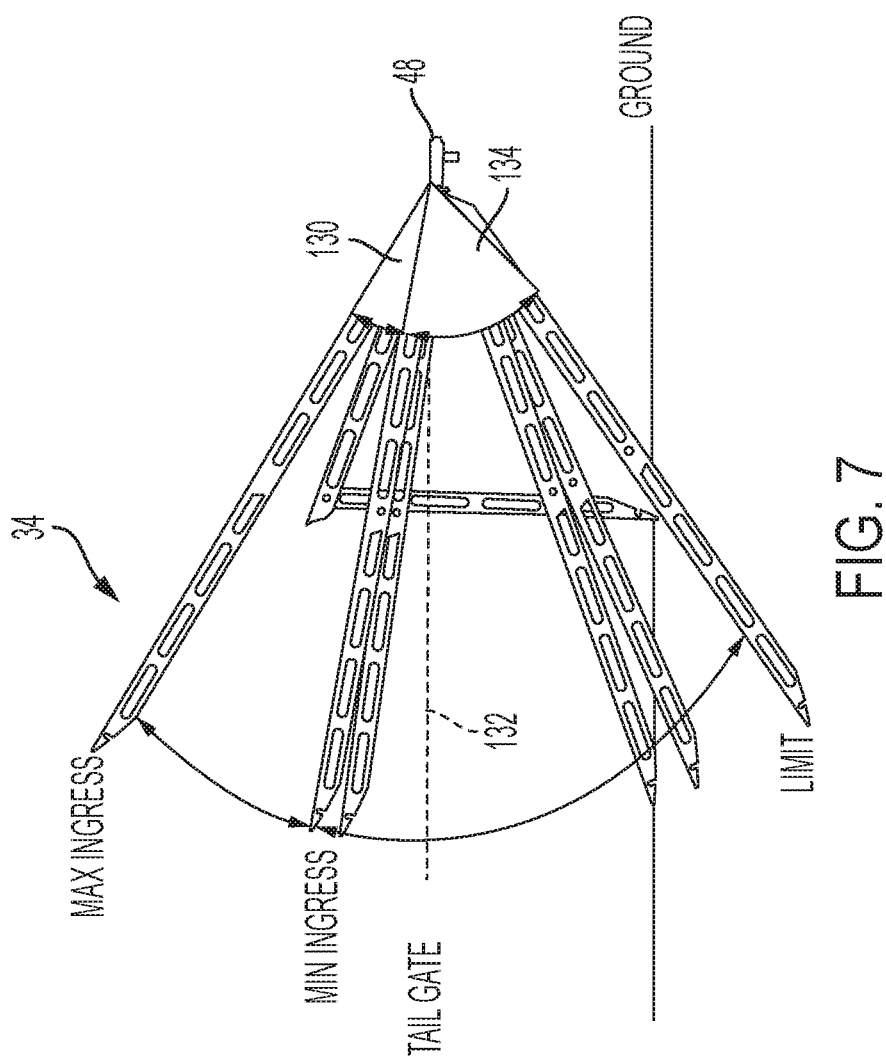
FIG. 7 is a side view of various positions of connections between the ramp members and interlocking tailgate utility bar shown in FIG. 1, according to the principles of the present disclosure.

In the example embodiment, each load ramp 34 generally includes an outer ramp member 38, an inner ramp member 40, and a vehicle coupling or attachment device 42 (see also FIGS. 6 and 7). The load ramps 34 are configured to provide a working surface such as for walking/rolling a smaller vehicle (e.g., ATV), or for supporting a power tool. The inner ramp member 40 is rotatably coupled to outer ramp member 38 such that inner ramp member 40 is movable between an extended, deployed position (FIG. 1) and a folded, stowed position where inner ramp member 40 is nested within outer ramp member 38. The load ramp 34 may then be coupled to the rail assembly 32 for stowage in storage bed 12. As shown in FIG. 1, when the tailgate 24 is in an open position, the load ramp 34 is configured to be removably secured thereto via the vehicle attachment device 42, which is configured to selectively secure to an interlocking tailgate utility bar 48, as will be described in more detail.

As shown in FIG. 1, in the example embodiment, the interlocking tailgate utility bar 48 is movable between a stowed position CS' and a deployed position D'. In the stowed position CS', the interlocking tailgate utility bar 48 is fitted and secured within lumber pockets 44 formed in the storage bed 12. In the deployed position D', the utility bar 48 is coupled to the tailgate latches 26 positioned on opposite sides 30 of the tailgate 24. More specifically, interlocking tailgate utility bar 48 is releasably coupled to the existing tailgate latches 26, as will be described herein in more detail, to thereby orient the interlocking tailgate utility bar 48 on the interior wall 46 of tailgate 24. In this way, the interlocking tailgate utility bar 48 extends generally cross-car and is positioned to receive and couple to the load ramp 34 via the attachment device 42.

Figure 2:
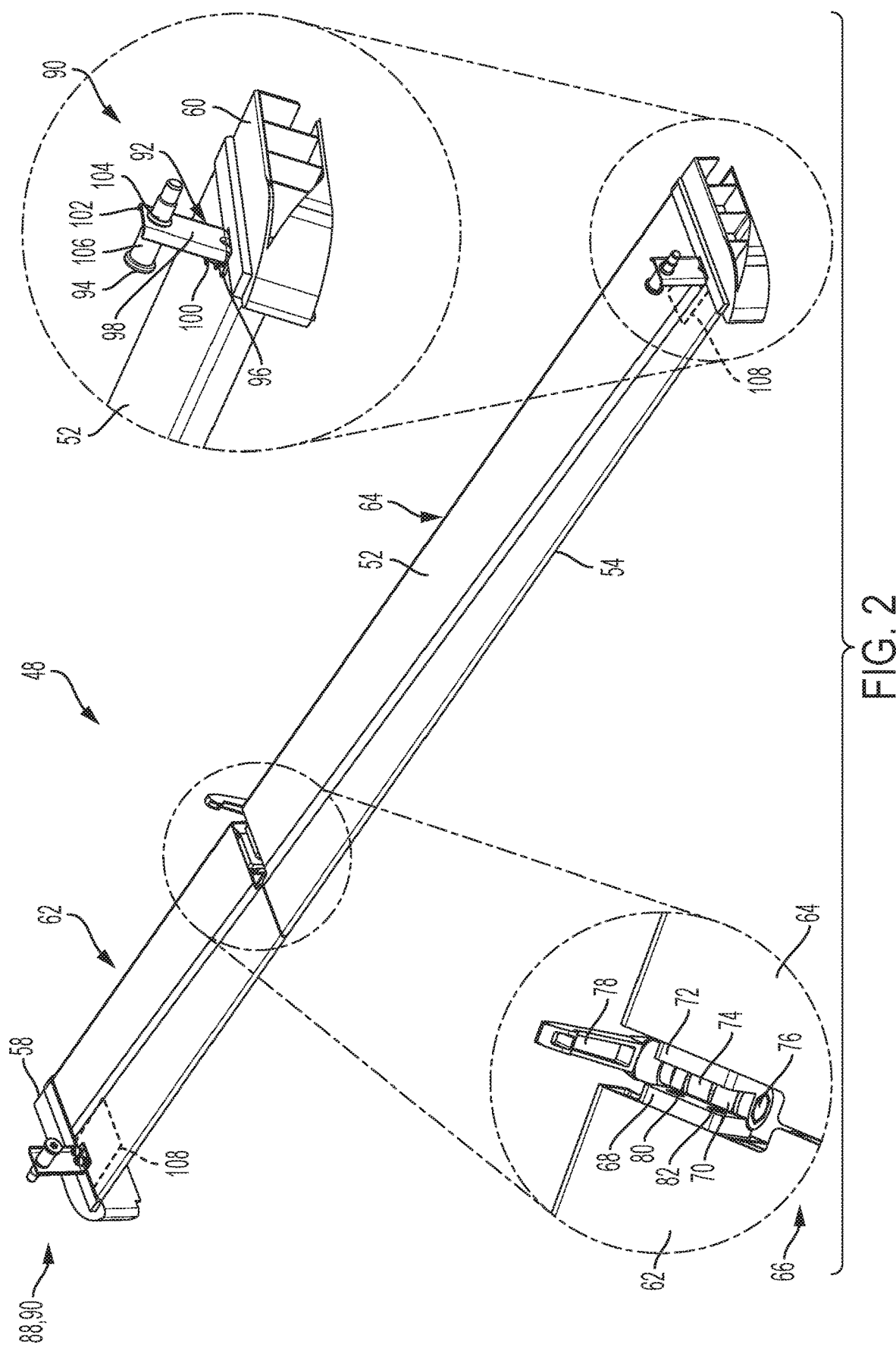
FIG. 2 is a bottom perspective view of the interlocking tailgate utility bar shown in FIG. 1 according to the principles of the present disclosure.
Figure 3:
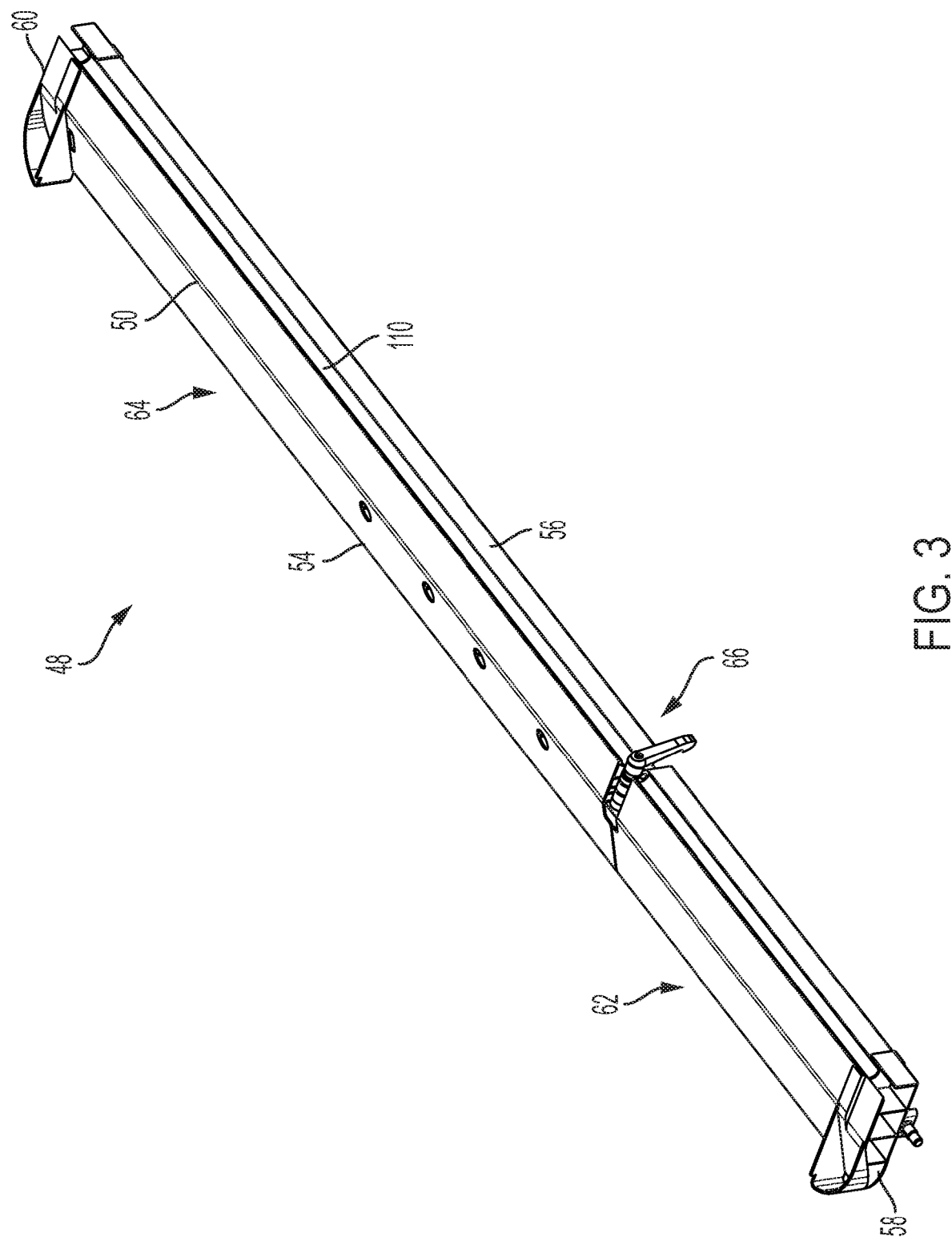
FIG. 3 is a top perspective view of the interlocking tailgate utility bar shown in FIG. 2 according to the principles of the present disclosure.
Figure 4:
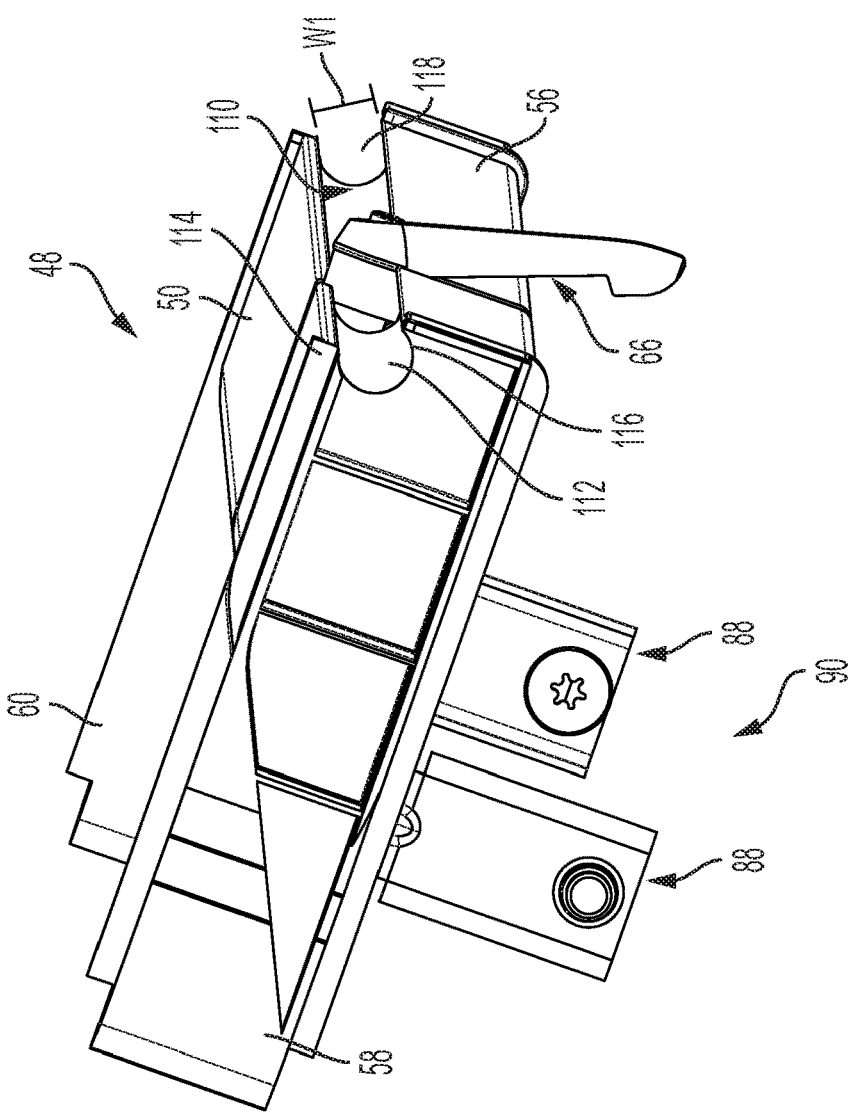
FIG. 4 is a side perspective view of the interlocking tailgate utility bar shown in FIG. 2 according to the principles of the present disclosure.

With additional reference to FIGS. 2-4, in the example embodiment, the interlocking tailgate utility bar 48 generally includes a top surface 50, a bottom surface 52, opposed front and rear side surfaces 54, 56, and opposed end fittings 58, 60. Moreover, the interlocking tailgate utility bar 48 is comprised of a first section 62 hingedly coupled to a second section 64 by a locking hinge 66, which enables selective movement between a locked, rigid position (shown in FIG. 2), and an unlocked position. This selectively unlocking between the first and second sections 62, 64 enables a slight shortening of a length of the interlocking tailgate utility bar 48, thereby facilitating easier ingress and egress when moving the interlocking tailgate utility bar 48 into and out of the stowed position 'S' in the lumber pockets.

As shown in FIG. 2, in one example implementation, the locking hinge 66 generally includes a first leaf 68 with a first knuckle 70, a second leaf 72 with a second knuckle 74, a hinge pin 76, and a locking handle 78. The first leaf 68 is coupled to the first section 62 via a plurality of fasteners 80 received through apertures 82. Similarly, the second leaf 72 is coupled to the second section 64 via a plurality of fasteners received through apertures (not shown). However, it will be appreciated that leaves 68, 72 may be coupled to respective sections 62, 64 by various suitable means such as, for example, via welding. First and second knuckles 70, 74 are generally cylindrical and define apertures configured to be aligned to receive the hinge pin 76. The locking handle 78 is operably coupled to the hinge pin 76 and is configured to be actuated (e.g., rotated) to move the locking hinge 66 between the unlocked position allowing relative hinged movement between first and second sections 62, 64, and the locked position preventing relative hinged movement between the first and second sections 62, 64.

In the stowed position 'S', the interlocking tailgate utility bar 48 is secured in a cross-car or substantially cross-car direction within the lumber pockets 44 formed in the storage bed 12, as seen in FIG. 1. In the example illustration, the lumber pockets 44 are defined by side channels 84 formed in sidewalls 22 and/or a floor channel 86 formed in the floor 18. In this position, rear side surface 56 is disposed against the floor 18, and end fittings 58, 60 are disposed against one of the sidewalls 22. As shown, the end fittings 58, 60 may be sized and shaped to be a complementary shape of the side channels 84, thereby facilitating a strong and secure fitting, for example, via an interference fit. Further, moving locking hinge 66 into the locked position facilitates creating outboard force from the end fittings 58, 60 against sidewalls 22 to further secure the utility bar 48 therebetween. Additionally, one or more retainers or clips (not shown) may be utilized to releasably secure the interlocking tailgate utility bar 48 to the storage bed 12.

To move to the deployed position 'D', the interlocking tailgate utility bar 48 is unlocked at the locking hinge 66, removed from the stowed position CS', and attached to the interior wall 46 of tailgate 24. In particular, the interlocking tailgate utility bar 48 includes a striker system 88 configured to releasably couple to the existing tailgate latches 26. As shown in FIG. 2, each end of the utility bar bottom surface 52 includes a striker assembly 90 that generally includes a support plate 92 and a striker 94. Each support plate 92 includes an attachment flange 96 and an extension plate 98.

In the example embodiment, the attachment flange 96 is coupled to the utility bar bottom surface 52 via one or more fasteners 100. However, attachment flange 96 may be coupled to the bottom surface 52 by other methods such as, for example, welding. The extension plate 98 extends outwardly from the attachment flange 96 and bottom surface 52 and includes a distal end 102 defining an aperture 104 to receive striker 94, which is coupled to the support plate 92, for example, via welding. The striker 94 extends in a direction parallel to or substantially parallel to the extension of the interlocking tailgate utility bar 48 and defines a striker surface 106 for engaging the tailgate latch 26. As shown in the illustrated example, extension plate 98 extends orthogonal to or substantially orthogonal to the striker 94, attachment flange 96, and bottom surface 52. In this way, the support plate 92 is configured to extend the striker 94 outwardly from bottom surface 52 such that striker 94 is able to reach and operably engage the tailgate latch 26 when the utility bar bottom surface 52 is located against the interior wall 46 of tailgate 24. In one example configuration, each striker assembly 90 is rotatably coupled to bottom surface 52 and configured to fold into a receiving cavity 108 (shown in phantom) formed in the bottom surface 52 such that the striker assembly 90 is moved to a concealed position flush with or below the bottom surface 52.

As shown in FIG. 1, once strikers 94 are inserted into the tailgate latches 26, the interlocking tailgate utility bar 48 is secured to the tailgate 24 with the bottom surface 52 disposed against the tailgate interior wall 46 and top surface 50 positioned with a slot or rail channel 110 facing upward and outward from a rear of the vehicle 10.

Figure 5:
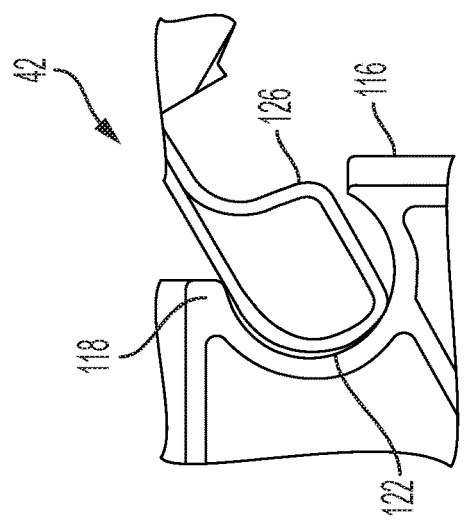
FIG. 5 is a side cross-sectional view of an installation position of the connection between the ramp member and the interlocking tailgate utility bars shown in FIG. 1, according to the principles of the present disclosure.

As shown in FIGS. 4-6, in the example embodiment, the rail channel 110 is a semi-circular or substantially semi-circular channel defined by a rounded wall 112 having an upper lip 114 and a lower lip 116. A space or gap 118 having a width 'w1' is formed between the upper and lower lips 114, 116, thereby selectively allowing for insertion of an attachment device of any suitable device or accessory, such as attachment device 42 of load ramp 34.

As shown in FIGS. 5 and 6, the attachment device 42 extends outwardly from the outer ramp member 38 of load ramp 34 and includes a flat upper surface 120, a rounded forward surface 122, a flat lower surface 124, and a rear stop or shoulder 126. A height 'h1' is defined between the upper surface 120 and the lower surface 124, which is less than the width 'w1'. In this way, the attachment device 42 is sized and shaped for selective insertion into the rail channel 110 and subsequent locking therein. Specifically, as shown in FIGS. 5 and 7, the orientation of gap 118 and width 'w1' allows for attachment device 42 to be inserted into the rail channel 110 only when the load ramp 34 and attachment device 42 are oriented at an angle within an installation zone 130 relative to the horizontal 132 and/or the open tailgate 24.

Once inserted into rail channel 110 such that rounded forward surface 122 engages the rounded channel wall 112, the rail channel 110 acts as a pivot point. As the load ramp 34 and attachment device 42 are subsequently lowered downwardly toward the ground, the rounded forward surface 122 rides along the rounded rail channel wall 112 until the load ramp 34 and attachment device 42 are oriented at an angle within a locking zone 134, as shown in FIGS. 6 and 7. Once oriented within the locking zone 134, the attachment device rear shoulder 126 is positioned to engage the lower lip 116 to thereby preventing removal of the attachment device 42 from the rail channel 110. To remove, load ramp 34 is simply rotated upward until the attachment device 42 is once again oriented at an angle within the installation zone 130.

With reference now to FIG. 8, in an alternative embodiment, the interlocking tailgate utility bar 48 is shown having a sliding plunger system 160 instead of locking hinge 66 to facilitate securing the interlocking tailgate utility bar 48 within the lumber pockets 44. However, it is contemplated that both locking hinge 66 and sliding plunger system 160 may be utilized together. In the example embodiment, the sliding plunger system 160 generally includes a handle 162, a plunger 164, and a stopper or engagement member 166. The handle 162 is rotatably coupled to the interlocking tailgate utility bar 48 and is configured slide the plunger 164 outward when the handle 162 is rotated. The plunger 164 is coupled to the engagement member 166 such that the outward movement causes the engagement member 166 to move outwardly away from the interlocking tailgate utility bar 48. Thus, once the interlocking tailgate utility bar 48 is moved into the stowed position 'S' in the lumber pockets 44, the handle 162 is rotated to move the engagement member 166 outwardly and into contact with the sidewalls 22 to further secure the utility bar 48 therebetween.

Described herein are systems and methods for an interlocking tailgate utility bar stowable within a vehicle and selectively attachable to the latches of a tailgate when the tailgate is in the open position. The interlocking tailgate utility bar includes an attachment channel configured to receive and retain an accessory such as a load ramp. Advantageously, the interlocking tailgate utility bar interlocks with existing hardware and requires no modifications to the tailgate. Thus, this enables an initially unmodified vehicle to be retrofitted or later modified to allow for coupling with additional attachments.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An interlocking tailgate utility bar for a vehicle having a tailgate at least partially defining a cargo area, the interlocking tailgate utility bar comprising:
   a top surface;
   a bottom surface opposite the top surface and configured to be disposed against an inner wall of the tailgate when the tailgate is in an open position;
   opposed front and rear side surfaces, and opposed ends;
   a striker assembly disposed at each end of the opposed ends and including a striker configured to be releasably coupled to tailgate latches located on opposed sides of the tailgate to thereby selectively releasably secure the interlocking tailgate utility bar to the tailgate; and
   a rail channel configured to receive an attachment device of a vehicle accessory to thereby removably couple the vehicle accessory to the interlocking tailgate utility bar and thus the vehicle.

2. The interlocking tailgate utility bar of claim 1, wherein the rail channel is defined by a generally circular wall that includes an upper lip and a lower lip.

3. The interlocking tailgate utility bar of claim 2, wherein a gap is defined between the upper lip and the lower lip that allows the attachment device to be inserted into the rail channel when the accessory is oriented at an angle within an installation zone.

4. The interlocking tailgate utility bar of claim 3, wherein at least one of the upper lip and the lower lip are configured to engage the attachment device and prevent removal of the attachment device from the rail channel when the accessory is oriented at an angle within a locking zone.

5. The interlocking tailgate utility bar of claim 1, wherein the rail channel is formed at least partially within an intersection between the top surface and the rear side surface.

6. The interlocking tailgate utility bar of claim 1, wherein the striker assembly further comprises a support plate coupled to the striker.

7. The interlocking tailgate utility bar of claim 6, wherein the support plate comprises an attachment flange and an extension plate, wherein the attachment flange is coupled to the bottom surface and the extension plate extends outwardly from the attachment flange.

8. The interlocking tailgate utility bar of claim 7, wherein:
   the striker is coupled to a distal end of the extension plate;
   the striker is oriented parallel to the bottom surface;
   the extension plate is oriented perpendicular to the striker; and
   the attachment flange is oriented perpendicular to the extension plate.

9. The interlocking tailgate utility bar of claim 1, wherein the striker assembly is rotatably coupled to the bottom surface and configured to fold into a receiving cavity formed in the bottom surface such that the striker assembly is moved to a concealed position therein.

10. The interlocking tailgate utility bar of claim 1, further comprising a first section hingedly coupled to a second section,
    wherein the first section is hingedly coupled to the second section by a locking hinge to enable selective movement between a rigid locked position, and an unlocked position allowing relative movement between the first and second section.

11. The interlocking tailgate utility bar of claim 10, wherein the locking hinge comprises:
    a first leaf coupled to the first section and including a first knuckle;
    a second leaf coupled to the second section and including a second knuckle; and
    a hinge pin received within the first and second knuckles.

12. The interlocking tailgate utility bar of claim 11, further comprising a locking handle operably coupled to the hinge pin, wherein the locking handle is configured to be actuated to move the locking hinge between the locked position and the unlocked position.

13. The interlocking tailgate utility bar of claim 1, further comprising a first section coupled to a second section, wherein the first section includes a sliding plunger system having an engagement member configured to selectively move outwardly away from the first section to contact a sidewall of the cargo area for securing the interlocking tailgate utility bar therein.

14. A vehicle comprising:
a tailgate at least partially defining a cargo area and movable between an open position and a closed position; and
an interlocking tailgate utility bar movable between a stowed position within the cargo area, and a deployed position removably coupled to the tailgate when in the open position, the interlocking tailgate utility bar comprising:
a top surface;
a bottom surface opposite the top surface and configured to be disposed against an inner wall of the tailgate when the tailgate is in the open position;
opposed front and rear side surfaces, and opposed ends; and
a rail channel configured to receive an attachment device of a vehicle accessory to thereby removably couple the vehicle accessory to the interlocking tailgate utility bar and thus the vehicle.

15. The vehicle of claim 14, wherein the interlocking tailgate utility bar further includes a striker assembly disposed at each end of the opposed ends and including a striker configured to be releasably coupled to tailgate latches located on opposed sides of the tailgate to thereby selectively releasably secure the interlocking tailgate utility bar to the tailgate.

16. The vehicle of claim 15, wherein the interlocking tailgate utility bar further comprises a first section hingedly coupled to a second section, and
wherein the striker assembly is rotatably coupled to the bottom surface and configured to fold into a receiving cavity formed in the bottom surface such that the striker assembly is moved to a concealed position therein.

17. The vehicle of claim 14, further comprising:
the accessory, wherein the accessory is a load ramp; and
a utility rail assembly coupled to a sidewall at least partially defining the cargo area, wherein the utility rail is configured to removably receive the load ramp to stow the cargo ramp within a cargo area of the vehicle.

18. The vehicle of claim 17, wherein the attachment device comprises a flat upper surface, a rounded forward surface, a flat lower surface, and a rear stop.

19. The vehicle of claim 14 wherein the rail channel is defined by a generally circular wall that includes an upper lip and a lower lip,
wherein a gap is defined between the upper lip and the lower lip that allows the attachment device to be inserted into the rail channel when the accessory is oriented at an angle within an installation zone, and
wherein at least one of the upper lip and the lower lip prevent are configured to engage the attachment device and prevent removal of the attachment device from the rail channel when the accessory is oriented at an angle within a locking zone.

* * * * *